US007243159B1

(12) United States Patent
Jayasimha et al.

(10) Patent No.: US 7,243,159 B1
(45) Date of Patent: Jul. 10, 2007

(54) ON DEMAND CAPABILITY EXCHANGE

(75) Inventors: Mysore Raghavan Jayasimha, Bangalore (IN); Prakash Daga, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 847 days.

(21) Appl. No.: 10/388,846

(22) Filed: Mar. 14, 2003

(51) Int. Cl.
   *G06F 15/16* (2006.01)
(52) U.S. Cl. ..................................................... 709/237
(58) Field of Classification Search ................. 709/237
   See application file for complete search history.

(56) References Cited

U.S. PATENT DOCUMENTS

| | | | | |
|---|---|---|---|---|
| 5,386,512 | A | * | 1/1995 | Crisman et al. ............ 709/228 |
| 5,838,781 | A | * | 11/1998 | Isaksson ..................... 379/229 |
| 6,819,749 | B1 | * | 11/2004 | Olafsson et al. ......... 379/93.32 |
| 2005/0041578 | A1 | * | 2/2005 | Huotari et al. .............. 370/229 |
| 2006/0174015 | A1 | * | 8/2006 | Arauz-Rosado ............. 709/228 |

OTHER PUBLICATIONS

ITU T (Telecommunication Standardization Sector of ITU) H.323 (Nov. 2000) Series H: Audiovisual and Multimedia Systems, Infrastructure of audiovisual services—Systems and terminal equipment for audiovisual services, "Packet-based multimedia communications systems" (242 pages).

ITU T (Telecommunication Standardization Sector of ITU) H.225.0 (Nov. 2000) Series H: Audiovisual and Multimedia Systems, Infrastructure of audiovisual services—Transmission multiplexing and synchronization, "Call signalling protocols and media stream packetization for packet-based multimedia communication systems" (251 pages).

ITU T (Telecommunication Standardization Sector of ITU) H.225.0 Amendment 1 (Nov. 2002) (32 pages).

ITU T (Telecommunication Standardization Sector of ITU) H.245.0 (Jul. 2001) Series H: Audiovisual and Multimedia Systems, Infrastructure of audiovisual services—Communication procedures, "Control protocol for multimedia communication" (318 pages).

* cited by examiner

*Primary Examiner*—Bunjob Jaroenchonwanit
*Assistant Examiner*—Julian Chang
(74) *Attorney, Agent, or Firm*—Marger Johnson & McCollom, PC

(57) ABSTRACT

A network device is disclosed. The network device has a port to allow reception of an incoming call at a first endpoint and a memory to store endpoint identifiers and associated capability information. A processor in the network device is to determine an identifier for a second endpoint from the incoming call, access associated capability information for the second endpoint, if it exists, set a first field value depending upon any associated capability information available, transmit a message including a first field value and then perform a capabilities exchange with the second endpoint, if necessary, depending upon the first field value and a second field value received from the other endpoint.

24 Claims, 4 Drawing Sheets

ON DEMAND CAPABILITY EXCHANGE

BACKGROUND

1. Field

This disclosure relates to establishing sessions in communications networks, more particularly to exchange of capabilities between endpoints during session establishment.

2. Background

Current communications systems use endpoints, such as gateways, to establish communication between two users. For an example, a User 1 dials or otherwise calls into a first endpoint that gives the user access to a communication network, such as a multimedia communication network in compliance with the ITU (International Telecommunications Union) recommendation H.323. The first endpoint then takes the information, such as the number dialed or an address provided by the user, and uses it in establishing a call across the network.

Generally, the call across the network will involve another endpoint, the terminating endpoint, which would then connect with User 2, the call recipient. During the call setup between the two endpoints, there is typically a capabilities exchange between the two. This allows the calling endpoint to determine in what format or with what signals the data should be exchanged with the called endpoint. Similarly, it allows the called endpoint the ability to determine in what format or with what signals the data may be exchanged.

In current systems, this capability exchange is performed, even if the two endpoints have previously interacted. For example, User 1 places a call to User 2 through endpoint 1 and endpoint 2. After this call, endpoint 1 'knows' the capabilities of endpoint 2. However, in a different call, where User 3 calls User 4, using the same two endpoints 1 and 2, the capability exchange still takes place. This would typically not be required, as the end points capability may not change too often, and elimination of this exchange would reduce network bandwidth consumption, as it would reduce the amount of message traffic on the network related to call setups.

SUMMARY

One embodiment of the invention is a network device. The network device has a port to allow reception of an incoming call at a first endpoint and a memory to store endpoint identifiers and associated capability information. A processor in the network device is to determine an identifier for a second endpoint from the incoming call, access associated capability information for the second endpoint, if it exists, set a first field value depending upon any associated capability information available, transmit a message including a first field value and then perform a capabilities exchange with the second endpoint, if necessary, depending upon the first field value and a second field value received from the other endpoint.

Another embodiment of the invention is the network device operating as an originating endpoint, and the processor is further to receive an acknowledgement message from a terminating endpoint.

Another embodiment of the invention is the network device operating as a terminating endpoint, and the processor is further to receive a setup message from an originating endpoint.

Another embodiment of the invention is a method to set up a call in a communication network.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
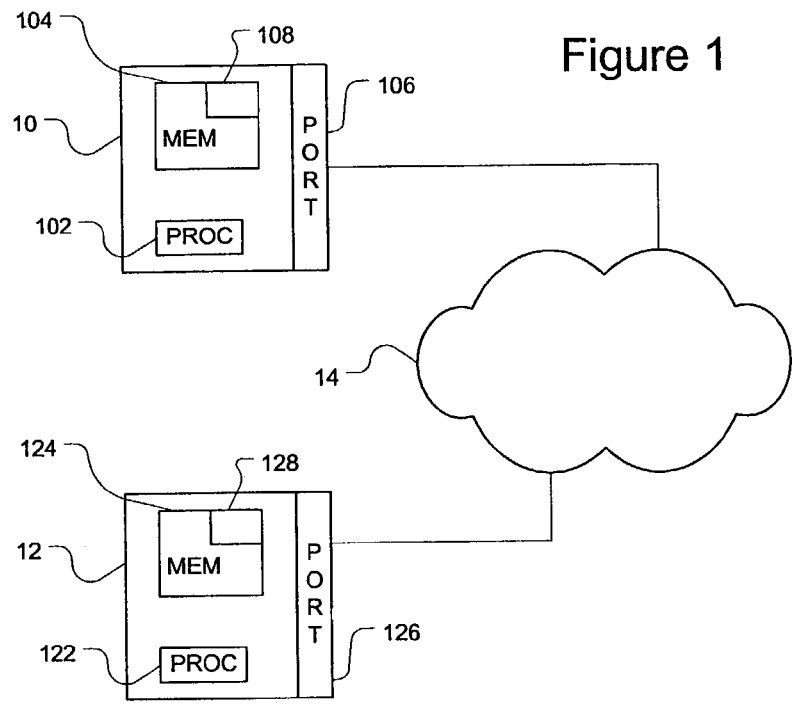
FIG. 1 shows an embodiment of a communication network having an originating endpoint and a terminating endpoint.

FIG. 1 shows an embodiment of a communication network having an originating endpoint 10 and a terminating endpoint 12. A network 14 connects the two endpoints. There may be other devices, such as routers and servers between the two endpoints. In that case, the information for one endpoint will be relayed across the network to the other endpoint. However, for purposes of discussion and ease of understanding of embodiments of the invention, it will be assumed that there are no intervening devices.

The endpoints could be any network device that allows a user to gain access to a communication network. For example, a first user, the caller, dials a number or otherwise provides an address for a second user, the receiver. The first user's call enters the communication network through the originating endpoint 10. The endpoint converts the incoming signals from the user's equipment into the appropriate form for transmission across the data network. For example, the user may dial into the originating endpoint using the publicly switched telephone network (PSTN), and the endpoint converts those signals to signals that can be transmitted across the communication network, in this case an Internet Protocol (IP) network.

On the other 'end' of the network, the terminating endpoint 12 is used to take the IP data and convert it back to PSTN signals to allow the terminating endpoint 12 to transmit the signals to the second user, the receiver. The endpoints could be gateways used in networks that follow the International Telecommunications Union (ITU) recommendation H.323. Alternatively, they could be Session Initiation Protocol (SIP) proxies. These are just examples and are not intended to limit the invention in any way.

The endpoints of interest here may both be the same kind of network device, such as routers or servers, or they could be different types of network device, with one being a router and the other being a server. However, they will both typically have a communications port such as 106 and 126, a processor 102 and 124, and a memory 104 and 124. Within the memory 104 and 124, there may be tables 108 and 128 of information, including capability information for other endpoints, as will be discussed later.

Figure 2A:
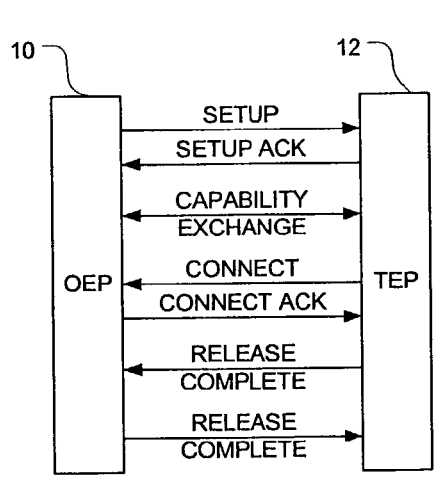
FIGS. 2a and 2b show embodiments of a call flow diagram in accordance with the prior art, and the embodiments of this invention, respectively.

FIG. 2a compare and contrast the current implementation of two H.323 gateway involved in a call setup process. H.323 examples will be used throughout this discussion, for the purpose of giving specific examples to promote understanding of the invention, with no intended limitation on the scope of application of the embodiments of the invention. In FIG. 2a, the originating endpoint (OEP) 10 receives an incoming call and sends a setup message to the terminating endpoint (TEP) 12. The terminating endpoint 12 then replies with a setup acknowledgement message. A capability exchange is then performed. In a H.323 network, the setup messages are generally done in accordance with ITU recommendation H.225.0, and the capability exchange is performed in accordance with ITU recommendation H.245.0.

Once the H.245.0 capability is exchanged, the endpoints 'know' the capabilities of the other endpoint and can adjust their reception and transmission characteristics accordingly. Typically, upon the capability exchange, the call proceeds with connect and connect acknowledgement messages under H.225.0. When the call is completed, the endpoints are released through an exchange of release complete messages under H.225.0.

However, some advantage can be gained by reducing the traffic associated with setting up calls. If the originating endpoint and terminating endpoints are known to each other, they may be able to avoid the capability exchange. This reduces the amount of traffic and time it takes to connect a call. An example of this is shown in FIG. 2*b*.

Figure 2B:
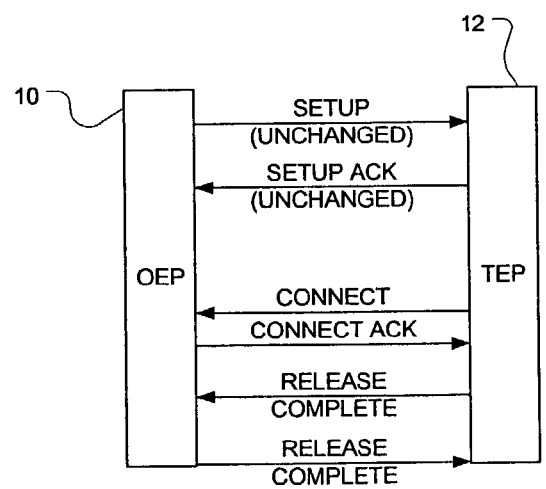

As can be seen in FIG. 2*b*, the setup and setup acknowledgement messages under H.225.0 including a field value that notifies the other endpoint that the capabilities are known and unchanged. The capability exchange can then be eliminated from the call set up process. This is shown in more detail in FIG. 3.

Figure 3:
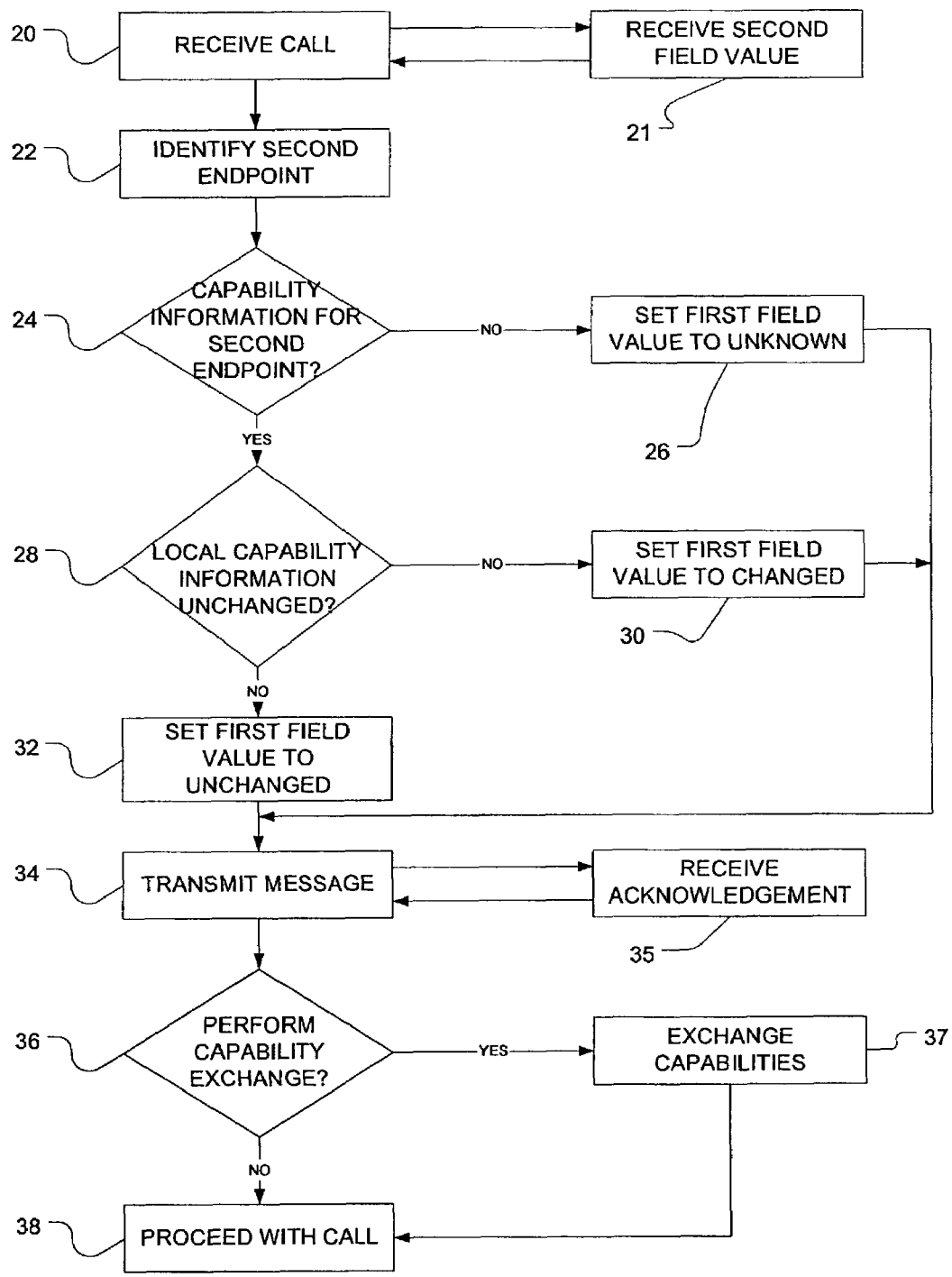
FIG. 3 shows a flowchart of an embodiment of a method to set up a call in a communication network.

The flowchart of FIG. 3 is generic to both originating and terminating endpoints in this embodiment. There are some messages that may be received by one or the other type of endpoint, which will be addressed as necessary. The incoming call is received at either endpoint at 20. The receiving endpoint will be referred to the local endpoint and the other endpoint will be referred to as the remote endpoint. If the endpoint is a terminating endpoint, it will access what is referred to here as the second field value at 21. The second field value is the field value transmitted from the remote endpoint. The field value indicates whether the remote endpoint knows the capability information of the local endpoint, whether the remote endpoint capability information has changed since the last call was exchanged between the two endpoints, and whether the remote endpoint information has remain unchanged.

The first field value is the field value for the local endpoint, whether terminating or originating. For an originating endpoint, for example, the first field value would be in the SETUP message of FIG. 2*b*. For a terminating endpoint, the first field value would be in the SETUP_ACK field of FIG. 2*b*. The references to 'first' and 'second' are not used in an ordering sense, but that the first field value is the locally set field value and the second field value is that received from the remote endpoint.

For the terminating endpoint, the call received is the setup message from the originating endpoint, in which the second field value resides. For an originating endpoint, the call received is the call from the user placing the call. Whichever endpoint is involved then identifies the second, or remote, endpoint from the incoming call. This could be accomplished from the address of the transmitting station, the called number identifier, etc. Once the second endpoint is identified, the first endpoint then determines if it has previously stored the capability information for the second endpoint. If the first endpoint does not have this information, at 24, it then sets the first field value to UNKNOWN and the process skips down to transmitting the message at 34. If the first endpoint does have the capability information for the second endpoint, the process then determines if the local capability information, that for the first endpoint, has changed.

If the local capability has changed at 28, the first field value is set to KNOWN_AND_CHANGED, or CHANGED for abbreviation purposes, at 30. This indicates that the first endpoint knows the second endpoint capability information, but that the capability information has changed for the first endpoint. If the local capability information remains unchanged at 28, the first field value is set to KNOWN_AND_UNCHANGED or UNCHANGED for abbreviation purposes at 32.

The local endpoint then transmits a message to the remote endpoint at 34. If the local endpoint is the originating endpoint, it will typically transmit a set up message and will receive an acknowledgement at 35. For the originating endpoint, the acknowledgment message will include the second field value, that for the remote, terminating endpoint. If the local endpoint is the terminating endpoint, the message transmitted will be the setup acknowledgement message, including the first field value.

The first and second field values are then examined at 36. If the two field values are anything other than both being KNOWN_AND_UNCHANGED, the capability exchange will be performed at 37 to update the respective capability information, or to originally inform the other endpoint of the capability information. If the two endpoints have the capability information for each other and it has not changed for either of them, the capability exchange is not necessary. The call is then proceeded with at 38.

Figure 4:
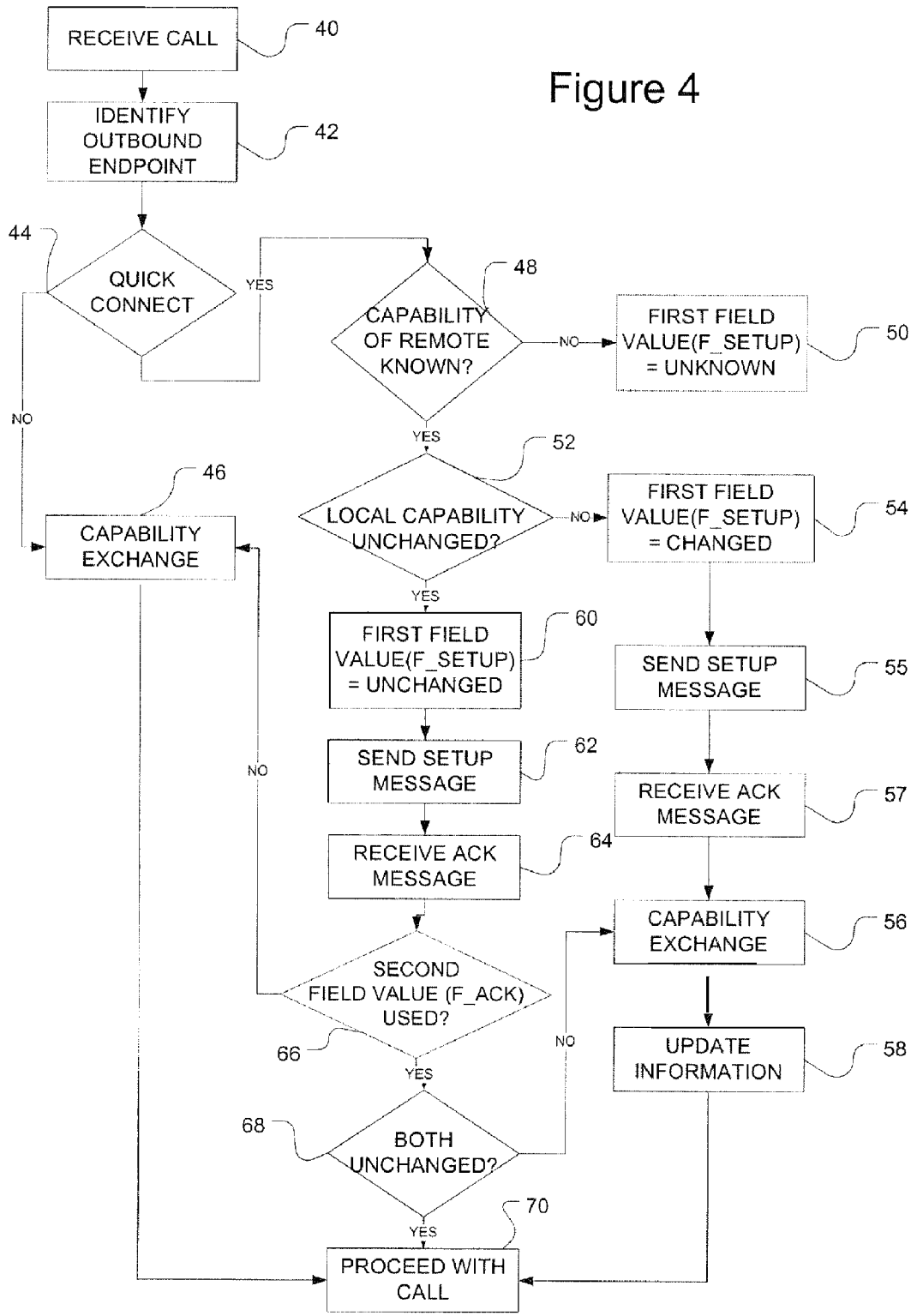
FIG. 4 shows a flowchart of an embodiment of a method to set up a call at an originating endpoint.

Having seen the general case applicable to both endpoints, it may be useful to address the specifics for each endpoint in turn. FIG. 4 shows one embodiment of a call setup process for an originating endpoint. The call is received from the user, such as across the PSTN, at 40. The originating endpoint then identifies the outbound endpoint for the call at 42. The process of determining whether or not the capability exchange could be skipped is referred to here as 'quick connect.' At 44, the originating endpoint determines whether or not the quick connect capability is available. If it is, the originating endpoint then determines if the capability of the terminating endpoint, the remote endpoint, is known. If not, the first field value, in this case F_SETUP is set to UNKNOWN. If the capability of the remote endpoint is known, the process then determines if the local capability information remains unchanged, since the last successful capability exchange, at 52.

If the local capability information has been changed at 52, the F_SETUP field is set to CHANGED. For either the CHANGED or UNKNOWN states, the setup message is then sent at 55 and the acknowledgement is received at 57. The capability exchange is performed with the other endpoint at 56 and the information is updated at 58. The call then proceeds at 70. Similarly, if quick connect is not configured, the capability exchange is performed at 46 and the call is proceeding with at 70.

However, if the local capability information has not changed at 52, the field is set to UNCHANGED at 60 and the setup message is sent at 62. The acknowledgement message is received at 64. If the F_ACK field that provides the second field value in this example is not used, the process proceeds to 46 to perform the capability exchange. If the F_ACK field is used, at 66, the process then determines if both the first and second fields are unchanged at 68. If either field is any value but UNCHANGED, the process proceeds to 56. After doing the H.245 capability exchange, the local endpoint updates the table that stores the capability information. In summary, for originating endpoints, the first field value is F_SETUP and the second field value is F_ACK received from the other endpoint.

Figure 5:
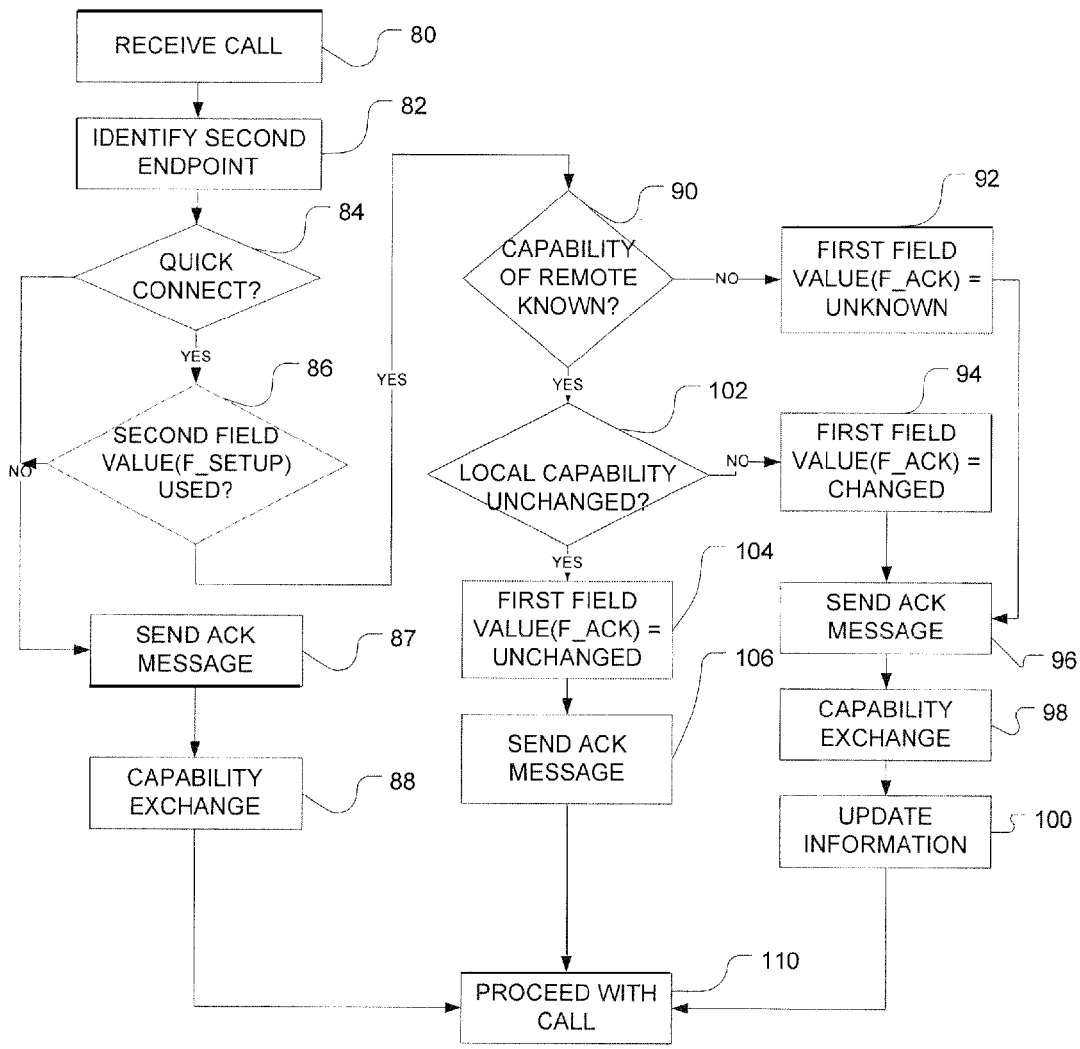
FIG. 5 shows a flowchart of an embodiment of a method to set up a call at a terminating endpoint.

For a terminating endpoint, the discussion now moves to FIG. 5. The call is received at 80. As this is a terminating endpoint, the call is actually the setup message from the originating endpoint. The terminating endpoint identifies the originating, or second, endpoint at 82. The terminating endpoint then determines if the quick connect process is available at 84. If not, the acknowledgement message is sent at 87 and the capability exchange is performed at 88. The call then proceeds at 110.

If quick connect is available at 84, the terminating endpoint then determines if F_SETUP is used at 86. If no, the process proceeds to 87. If the F_SETUP field is used, the terminating endpoint now has the second field value, and the process proceeds to 90. At 90, it is determined whether the capability information is known for the originating endpoint. If not, the field is set to UNKNOWN and the process moves to 96, where an acknowledgement message is sent. The capability exchange is then performed at 98 and the information about the remote endpoint is updated at the local endpoint at 100.

However, if the capability information is known at 90, the process then determines if the local capability is unchanged at 102. If the local capability information has changed, the F_ACK field is set to CHANGED, and the process proceeds to 96. If the local capability information has not changed at 102, the F_ACK field is set to UNCHANGED at 104. The ACK message is then sent at 106. The capability exchange in not necessary in this situation, the process proceeds with the call at 110.

In this manner, a possibility exists that the overhead traffic and time associated with call setups may be reduced. The specific implementations are left up to the system designer. However, in an H.323 network, the identifier that allows the endpoints to identify each other may be a dial peer tag. The fields F_SETUP and F_ACK may be implemented in the Setup_UUIE structure, using two bits, according to the following table:

| | |
|---|---|
| Unknown => | 00 |
| Known and changed => | 01 |
| Known and unchanged => | 10 |

This field may be added as a new element in the Setup_UUIE structure or could be implemented as an optional field.

Similarly, determination of the capability information for a particular endpoint may be accomplished by using the identifier, such as the dial peer tag, as an index into a table, such as table 108 in memory 104 of FIG. 1. Also, as mentioned previously, the endpoints may be H.323 gateways or SIP proxies as examples. The embodiments of the invention could be implemented as a new form of network device, or as an upgrade to the operational software or firmware of the current devices. In the latter case, the invention may be embodied as an article of machine-readable code containing instructions that, when executed, perform the methods of the invention. The machine executing the code would be the endpoints.

Thus, although there has been described to this point a particular embodiment for a method and apparatus for on demand capability exchange in communication networks, it is not intended that such specific references be considered as limitations upon the scope of this invention except in-so-far as set forth in the following claims.

What is claimed is:

1. A network device, comprising:
   a port to allow reception of an incoming call at a first endpoint;
   a memory to store endpoint identifiers and associated capability information; and
   a processor to:
   determine an identifier of a second endpoint from the incoming call;
   access the associated information for the second endpoint, if it exists;
   set a first field value for the first endpoint to one of status codes including unknown, known and changed, and known and unchanged, depending upon the availability of any associated capability information;
   transmit a message including the first field value from the first endpoint to the second endpoint; and
   perform a capabilities exchange with the second endpoint, if necessary, depending upon the first field value of the first endpoint and a second field value received from the second endpoint, where the second field value is set to one of status codes including unknown, known and changed, and known and unchanged,
   wherein capabilities exchange is avoided only when the first field value is set to known and unchanged and the received second field value is known and unchanged.

2. The network device of claim 1, wherein the first endpoint is an originating endpoint and the second endpoint is a terminating endpoint.

3. The network device of claim 2, wherein the first field value is a field setup value and the second field value is a field acknowledgement value.

4. The network device of claim 2, wherein the processor is further to set the first field value to one of either known and changed or unknown and to perform the capabilities exchange.

5. The network device of claim 1, wherein the first endpoint is a terminating endpoint and the second endpoint is an originating endpoint.

6. The network device of claim 5, wherein the first field value is a field acknowledgement value and the second field value is a field setup value.

7. The network device of claim 5, wherein the processor is further to set the first field value to one of either known and changed or unknown and to perform the capabilities exchange.

8. A method, the method comprising:
   receiving an incoming call at a first endpoint;
   identifying a second endpoint associated with the incoming call;
   accessing capability information for the second endpoint, if it exists;
   determining if capability information for the first endpoint has changed;
   setting a first field value for the first endpoint to one of status codes including unknown, known and changed, and known and unchanged, depending upon the capability information for at least one of the first and second endpoints;
   transmitting a message to the second endpoint including the first field value; and
   performing a capability exchange with the second endpoint, as necessary, depending upon the first field value of the first endpoint and a second field value received from the second endpoint, where the second field value is set to one of status codes including unknown, known and changed, and known and unchanged, wherein capabilities exchange is avoided only when the first field value is set to known and unchanged and the received second field value is known and unchanged.

9. The method of claim 8, wherein setting a first field value further comprises setting the first field value to unknown based upon the capability information for the second endpoint.

10. The method of claim 8, wherein setting a first field value further comprises setting the first field value to known and changed based upon the capability information for the first endpoint.

11. The method of claim 8, wherein setting a first field value further comprises setting the first field value to known and unchanged based upon the capability information for the first endpoint.

12. The method of claim 8, the method further comprising receiving an acknowledgement message from the second endpoint containing the second field value.

13. The method of claim 8, the method further comprising receiving a setup message from the second endpoint containing the second field value.

14. A network device, comprising:
 a means for allowing reception of an incoming call at a first endpoint;
 a means for storing endpoint identifiers and associated capability information; and
 a means for:
 determining an identifier of a second endpoint from the incoming call;
 accessing the associated information for the second endpoint, if it exists;
 setting a first field value for the first endpoint to one of status codes including unknown, known and changed, and known and unchanged, depending upon the availability of any associated capability information;
 transmitting a message including the first field value from the first endpoint to the second endpoint; and
 performing a capabilities exchange with the second endpoint, if necessary, depending upon the first field value of the first endpoint and a second field value received from the second endpoint, where the second field value is set to one of status codes including unknown, known and changed, and known and unchanged, wherein capabilities exchange is avoided only when the first field value is set to known and unchanged and the received second field value is known and unchanged.

15. The network device of claim 14, the network device further comprising an originating endpoint.

16. The network device of claim 14, the network device further comprising a terminating endpoint.

17. An article of computer-readable code containing instructions that, when executed, cause a computer to:
 receive an incoming call at a first endpoint;
 identify a second endpoint associated with the incoming call;
 access capability information for the second endpoint, if it exists;
 determine if capability information for the first endpoint has changed;
 set a first field value for the first endpoint to one of status codes including unknown, known and changed, and known and unchanged, depending upon the capability information for at least one of the first and second endpoints;
 transmit a message to the second endpoint including the first field value; and
 perform a capability exchange with the second endpoint, as necessary, depending upon the first field value of the first endpoint and a second field value received from the second endpoint, where the second field value is set to one of status codes including unknown, known and changed, and known and unchanged, wherein capabilities exchange is avoided only when the first field value is set to known and unchanged and the received second field value is known and unchanged.

18. The article of claim 17, the computer further comprising an originating endpoint.

19. The article of claim 17, the computer further comprising a terminating endpoint.

20. The article of claim 17, wherein the instructions that, when executed, cause the computer to set a first field value further cause the to set the first field value to unknown based upon the capability information for the second endpoint.

21. The article of claim 17, wherein the instructions that, when executed, cause the computer to set the first field value further causes the computer to set the first field value to known and changed based upon the capability information for the first endpoint.

22. The article of claim 17, wherein the instructions that, when executed, cause the computer to set the first field value further causes the computer to set the first field value to known and unchanged based upon the capability information for the first endpoint.

23. The article of claim 17, the instructions further cause the computer to receive an acknowledgement message from the second endpoint containing the second field value.

24. The article of claim 17, wherein the instructions further cause the computer to receive a setup message from the second endpoint containing the second field value.

* * * * *